United States Patent
Lee et al.

(10) Patent No.: US 8,841,010 B2
(45) Date of Patent: Sep. 23, 2014

(54) SECONDARY BATTERY PACK AND PTC ELEMENT HAVING EXCELLENT PRODUCTION PROCESS PROPERTY

(75) Inventors: Dongcheol Lee, Chungcheongbuk-do (KR); Jeong Ho Lee, Chungcheongbuk-do (KR); Heegyu Kim, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 766 days.

(21) Appl. No.: 12/747,720

(22) PCT Filed: Nov. 7, 2008

(86) PCT No.: PCT/KR2008/006560
§ 371 (c)(1),
(2), (4) Date: Nov. 4, 2010

(87) PCT Pub. No.: WO2009/078580
PCT Pub. Date: Jun. 25, 2009

(65) Prior Publication Data
US 2011/0039129 A1 Feb. 17, 2011

(30) Foreign Application Priority Data

Dec. 14, 2007 (KR) .......................... 10-2007-0131583

(51) Int. Cl.
*H01M 2/00* (2006.01)
*H01M 10/42* (2006.01)
*H01M 2/10* (2006.01)
*H01M 2/04* (2006.01)

(52) U.S. Cl.
CPC ...... *H01M 2/0404* (2013.01); *H01M 2200/106* (2013.01); *H01M 10/4257* (2013.01); *H01M 2/1022* (2013.01); *H01M 2220/30* (2013.01); *Y02E 60/12* (2013.01); *H01M 2/1061* (2013.01)
USPC .............................. 429/7; 429/162; 429/163

(58) Field of Classification Search
None
See application file for complete search history.

(56) References Cited

U.S. PATENT DOCUMENTS 5,707,756 A 1/1998 Inoue et al.
2004/0251872 A1 12/2004 Wang et al.
(Continued)

FOREIGN PATENT DOCUMENTS

CN 2631052 Y 8/2004
JP 8-153536 A 6/1996
(Continued)

*Primary Examiner* — Ula C Ruddock
*Assistant Examiner* — Tony Chuo
(74) *Attorney, Agent, or Firm* — Birch, Stewart, Kolasch & Birch, LLP (57) ABSTRACT

Disclosed herein is a secondary battery pack including a battery cell having an electrode assembly of a cathode/separator/anode structure mounted in a battery case together with an electrolyte in a sealed state, an insulative mounting member having openings through which electrode terminals of the battery cell are exposed outward, the insulative mounting member being constructed in a structure in which connection members and a protection circuit board are loaded on the top of the insulative mounting member, the insulative mounting member being mounted to the top of the battery cell, and an insulative cap coupled to an upper end of the battery cell for covering the insulative mounting member in a state in which the connection members and the protection circuit board are loaded on the insulative mounting member, wherein the insulative mounting member is provided at an upper part thereof with at least one coupling groove, the connection members and the protection circuit board are provided with through-holes communicating with the coupling groove, and a predetermined mechanical fastening member is inserted into the coupling groove through the through-holes, thereby achieving the coupling of the connection members and the protection circuit board to the insulative mounting member.

18 Claims, 4 Drawing Sheets

(56) References Cited

U.S. PATENT DOCUMENTS

| | | |
|---|---|---|
| 2005/0140338 A1 | 6/2005 | Kim et al. |
| 2006/0046139 A1 | 3/2006 | Suzuki et al. |
| 2006/0071637 A1 | 4/2006 | Heo et al. |
| 2006/0127755 A1 | 6/2006 | Cho |
| 2006/0210870 A1 | 9/2006 | Moon et al. |
| 2007/0026302 A1 | 2/2007 | Yoon |
| 2009/0155631 A1 | 6/2009 | Baek et al. |

FOREIGN PATENT DOCUMENTS

| | | | | |
|---|---|---|---|---|
| JP | 2003-22790 A | 1/2003 | | |
| JP | 2004-71345 A | 3/2004 | | |
| JP | 2006-66090 A | 3/2006 | | |
| JP | 2006-147193 | * 6/2006 | ............. | H01M 2/10 |
| JP | 2006-147574 A | 6/2006 | | |
| JP | 2007-35638 A | 2/2007 | | |
| JP | 2007-165328 A | 6/2007 | | |
| JP | 2009-146897 A | 7/2009 | | |
| KR | 10-2002-0021887 A | 3/2002 | | |
| KR | 10-2005-0060187 A | 6/2005 | | |
| KR | 10-2005-0097699 A | 10/2005 | | |
| KR | 20-0406606 Y1 | 1/2006 | | |
| KR | 10-2006-0027272 A | 3/2006 | | |
| KR | 10-2006-0032591 A | 4/2006 | | |
| KR | 10-2008-0036252 | * 4/2008 | ............. | H01M 2/22 |

* cited by examiner

SECONDARY BATTERY PACK AND PTC ELEMENT HAVING EXCELLENT PRODUCTION PROCESS PROPERTY

FIELD OF THE INVENTION

The present invention relates to a secondary battery pack having an excellent production process property using connection members, and, more particularly, to a secondary battery pack including a battery cell having an electrode assembly mounted in a battery case together with an electrolyte, an insulative mounting member mounted to the top of the battery cell, and an insulative cap coupled to an upper end of the battery cell for covering the insulative mounting member, wherein the insulative mounting member is provided at an upper part thereof with at least one coupling groove, the connection members and the protection circuit board are provided with through-holes communicating with the coupling groove, and a predetermined mechanical fastening member is inserted into the coupling groove through the through-holes, thereby achieving the coupling of the connection members and the protection circuit board to the insulative mounting member.

BACKGROUND OF THE INVENTION

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

Also, the secondary batteries have attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary batteries are being diversified owing to advantages of the secondary batteries, and hereafter the secondary batteries are expected to be applied to more applications and products than now.

However, various combustible materials are contained in the lithium secondary battery. As a result, there is a possibility of danger in that the lithium secondary battery can be heated or explode due to overcharge, overcurrent, or any other external physical impacts. In other words, the lithium secondary battery has low safety. Consequently, a protection circuit module (PCM) for effectively controlling the abnormality of the lithium secondary battery, such as overcharge, is mounted in the lithium secondary battery while the PCM is connected to a battery cell of the lithium secondary battery.

Generally, it is required for safety elements, including the PCM, to be maintained in electrical connection with electrode terminals of the battery cell and, at the same time, to be electrically isolated from other parts of the battery cell. Consequently, a plurality of insulative mounting members are required to construct such connection, with the result that the battery assembling process is complicated. Also, an adhesive may be applied between the safety elements and the insulative mounting members to achieve the coupling between the safety elements and the insulative mounting members. However, this coupling method weakens the strength of the battery. Consequently, a short circuit may occur in the battery cell due to the weakening of the coupling strength, when external impacts are applied to the battery cell, with the result that the battery cell may catch fire or explode. In other words, safety-related problems may occur.

Therefore, research has been actively made on technologies for easily assembling the insulative mounting members and the safety elements loaded on the top of the battery cell and, at the same time, increasing the mechanical strength of the battery pack. For example, Korean Patent Application Publication No. 2006-0027272 discloses a battery pack including a bare cell, a protection circuit board electrically connected to the bare cell, a case integrally coupled to the bare cell and the protection circuit board such that a predetermined region of the bare cell is exposed outward through the case, and a resin for covering the bare cell exposed outward through the case. Also, Japanese Patent Application Publication No. 2007-165328 discloses a battery constructed in a structure in which an external connection terminal is formed at the outer circumferential part of one side of a battery body, a circuit board, as a protection circuit element, is mounted to the other side of the outer circumferential part of the battery body, a cathode and an anode of the battery body are electrically connected to the circuit board by connection members, at which heat sensitive element are arranged, wherein a mold having the connection members, the battery body, and the circuit board disposed therein is filled with resin to form a mold body attached to arbitrary surfaces of the battery body and the circuit board to integrate the battery body and the circuit board.

In the above-described technologies, however, a process for filling the space defined between the electrode terminals and the protection circuit board at the top of the battery pack with resin is added, with the result that the manufacturing process is complicated, and the weight of the battery pack is increased. Furthermore, the improvement in mechanical strength of the battery pack does not come up to expectations.

Consequently, there is a high necessity for a technology that is capable of reducing the number of members mounted to the top of the battery cell to simplify the assembling process and achieving the connection between the connection members, the mounting member, and the protection circuit board in a no-welding manner while simultaneously stably securing a coupling strength.

SUMMARY OF THE INVENTION

Therefore, the present invention has been made to solve the above problems, and other technical problems that have yet to be resolved.

As a result of a variety of extensive and intensive studies and experiments to solve the problems as described above, the inventors of the present invention have found that, when a secondary battery pack is constructed by coupling an insulative mounting member, connection members, and a protection circuit board, which are mounted on the upper end of the battery pack, through a specific coupling structure, it is possible to greatly simplify the assembling process and improve the coupling between the components during the manufacturing process while securing the safety of the battery cell. The present invention has been completed based on these findings.

Therefore, it is an object of the present invention to provide a secondary battery pack including an insulative mounting member, connection members, and a protection circuit board, which are coupled to one another through a specific coupling structure.

In accordance with one aspect of the present invention, the above and other objects can be accomplished by the provision of a secondary battery pack including a battery cell having an electrode assembly of a cathode/separator/anode structure mounted in a battery case together with an electrolyte in a sealed state, an insulative mounting member having openings through which electrode terminals of the battery cell are exposed outward, the insulative mounting member being constructed in a structure in which connection members and a protection circuit board are loaded on the top of the insulative mounting member, the insulative mounting member being mounted to the top of the battery cell, and an insulative cap coupled to an upper end of the battery cell for covering the insulative mounting member in a state in which the connection members and the protection circuit board are loaded on the insulative mounting member, wherein the insulative mounting member is provided at an upper part thereof with at least one coupling groove, the connection members and the protection circuit board are provided with through-holes communicating with the coupling groove, and a predetermined mechanical fastening member is inserted into the coupling groove through the through-holes, thereby achieving the coupling of the connection members and the protection circuit board to the insulative mounting member.

That is, the secondary battery pack according to the present invention is constituted by the battery cell, the insulative mounting member, and the insulative cap. The coupling of the connection members and the protection circuit board to the insulative mounting member is achieved by inserting the mechanical fastening member into the coupling groove through the through-holes communicating the coupling groove. Consequently, the assembly of the secondary battery pack is achieved in a simple coupling fashion. Also, in the secondary battery pack according to the present invention, the insulative mounting member, the connection members, and the protection circuit board are configured in a structure in which the coupling of the connection members and the protection circuit board to the insulative mounting member is easily achieved. Consequently, the manufacturing process is simplified and a very stable coupling structure is embodied, as compared with the conventional structure requiring several welding or soldering processes.

It is required for the battery case to exhibit easy processability and a mechanical strength of a predetermined level or more. For example, the battery case may be a metal container. Preferably, the battery case is an aluminum container.

The connection members may further include a function to improve the safety of the battery pack in addition to a function to electrically interconnect the electrode terminals and the protection circuit board. For example, one of the connection members may be coupled to a positive temperature coefficient (PTC) element. Consequently, the connection member, which is coupled to the PTC element, interrupts current flowing to the upper assembly of the battery pack, when the temperature of the battery pack abruptly increases due to an internal short circuit or the like, thereby improving the safety of the battery pack.

Also, the connection members are preferably configured in a structure in which the connection members are easily and stably coupled to the insulative mounting member and the protection circuit board. For example, each of the connection members may be provided at one end thereof with a first through-hole for coupling with the insulative mounting member and a second through-hole for coupling with the protection circuit board.

Consequently, the insulative mounting member is coupled to each of the connection members through the first through-hole, and the protection circuit board is coupled to each of the connection members through the second through-hole, with the result that the connection members and the protection circuit board are stably fixed to the insulative mounting member in position according to the design. In this structure, the second through-hole contributes to the coupling to the insulative mounting member as well as the coupling to the protection circuit board by the mechanical fastening member.

The shape of the first through-hole and the second through-hole is not particularly restricted so long as the coupling of the connection members and the protection circuit board to the insulative mounting member is easily and stably achieved by the first through-hole and the second through-hole. For example, the first through-hole may be formed in the plan shape of a slit, and the second through-hole may be formed in the plan shape of a star.

The first through-hole and the second through-hole, formed in the above-specified shapes, solve the assembly-related problems caused due to an error in manufacture or design and further reinforces the coupling and electrical connection between the connection members, the protection circuit board, and the insulative mounting member. Specifically, when a predetermined protrusion, which is configured to be inserted through the first through-hole, is formed on the insulative mounting member, the protrusion of the insulative mounting member can be inserted through the slit-shaped first through-hole within an error range corresponding to the length of the slit, and therefore, the coupling between the connection members and the insulative mounting member is achieved without difficulty although an error occurs in manufacture or design. Also, when the mechanical fastening member is made of a conductive metal material such that the mechanical fastening member can contribute to the electrical connection between connection members and the protection circuit board as well as the coupling between the connection members and the protection circuit board, the star-shaped region is deformed by the mechanical fastening member, as the mechanical fastening member is inserted through the second through-hole, thereby achieving high coupling strength and stable electrical connection.

The connection members may be connected to the electrode terminals of the battery cell and the protection circuit board in various manners. For example, one end of the connection member ('first connection member') coupled to the PTC element may be connected to the first electrode terminal of the battery cell, and the other end of the first connection member may be connected to the protection circuit board. Also, one end of the other connection member ('second connection member') may be connected to the second electrode terminal of the battery cell, and the other end of the second connection member may be connected to the protection circuit board.

In this structure, it is more preferable that the one ends of the first connection member and the second connection member, connected to the protection circuit board, are bent such that the ends of the first connection member and the second connection member are higher than the other ends of the first connection member and the second connection member, connected to the battery cell, whereby the first connection member and the second connection member are electrically connected to the protection circuit board while the first connection member and the second connection member are stably loaded on the insulative mounting member.

A protection circuit is connected to regions where the connection members are in contact with the protection circuit board such that the connection members are electrically connected to the protection circuit board at the regions where the connection members are in contact with the protection circuit board. The material for the connection members is not particularly restricted so long as the connection members are made of a conductive material. Preferably, the connection members are formed of a nickel plate.

The insulative mounting member is configured in a structure having the connection members and the protection circuit module loaded at the top thereof. The insulative mounting member is made of a insulative material direct contacting the top of the battery cell.

In an exemplary embodiment, the insulative mounting member has a size approximately equal to that of the top of the battery cell, and the insulative mounting member is provided at a middle part thereof with a first opening, through which the first electrode terminal of the battery cell is exposed outward, and is provided at a position spaced a predetermined distance from the first opening with a second opening, through which a portion of a top of the battery case of the battery cell (the second electrode terminal) is exposed outward.

In another exemplary embodiment, opposite ends of the insulative mounting member protrude upward by a predetermined height, thereby easily securing an installation space for each connection member upward bent at one end thereof, as previously described.

The top of the insulative mounting member may be formed in a shape corresponding to the connection members such that the connection members are mounted on the top of the insulative mounting member while being fixed in position, and the insulative mounting member may be provided at opposite sides thereof with protrusions configured to be coupled into the through-holes (the first through-holes) of the respective connection members, thereby more stably achieving the coupling between the insulative mounting member and the connection members.

The mechanical fastening member is not particularly restricted so long as the mechanical fastening member is inserted into the coupling groove of the insulative mounting member through the through-holes of the connection members and the protection circuit board while the mechanical fastening member exhibits a predetermined coupling strength. Preferably, the mechanical fastening member is formed of a conductive pin or rivet such that the mechanical fastening member provides more stable electrical connection between the protection circuit board and the connection member in addition to the mechanical coupling between the protection circuit board and the connection member as previously described.

Meanwhile, the mechanical fastening member may have a length corresponding to the sum of the thickness of the protection circuit board, the thickness of each connection member, and the depth of the coupling groove of the insulative mounting member such that the mechanical fastening member is not exposed outward from the insulative cap.

According to circumstances, an adhesive may be injected into the coupling groove and/or the through-holes, before the coupling of the mechanical fastening member, to complement the coupling force provided by the mechanical fastening member.

The insulative cap serves to protect the battery cell from external impact, complement the mechanical strength of the members mounted at the top of the battery cell, and maintain electrical insulation between the members. Preferably, the insulative cap extends downward by a predetermined length such that at least a portion of the insulative cap covers the outside surface of the upper end of the battery cell in a state in which the insulative cap is coupled to the upper end of the battery cell, thereby improving the coupling to the battery cell. In order to maximize such an effect, the downward extension of the insulative cap is preferably joined to the outer surface of the upper end of the battery cell by bonding or by mechanical coupling.

In addition to the insulative cap coupled to the upper end of the battery cell, an additional insulative cap (a bottom cap) may be also mounted to the lower end of the battery cell. Also, a sheathing film may be attached to the outer surface of the battery case of the battery cell. Consequently, the battery cell is protected from external impact, and the electrical insulation of the battery cell is maintained, by the provision of the sheathing film. Preferably, the sheathing film is attached to the outer surface of the battery case such that the sheathing film covers the lower extension of the insulative cap.

The secondary battery pack according to the present invention may be applicable in various manners irrespective of the kind and appearance of the battery cell. Preferably, the battery cell is a prismatic lithium secondary battery cell.

In accordance with another aspect of the present invention, there is provided a PTC element mounted to a secondary battery cell, the PTC including a PTC body of which a resistance increases with the increase of a temperature and a pair of metal plates for connection, which are attached to opposite ends of the PTC body, wherein one of the metal plates is provided with a first through-hole for coupling with an insulative mounting member and a second through-hole for coupling with a protection circuit board.

Generally, the PTC element is a separate member, which is mounted on the top of the battery cell while being electrically connected to the top of the battery cell. Consequently, complicated and troublesome processes for coupling the PTC element to the battery cell, such as a large number of welding or soldering processes, are required to mount the PTC element to the outside of the battery cell, and, in addition, a space necessary to mount the PTC element to the top of the battery cell is required.

In the PTC element according to the present invention, on the other hand, the first through-hole for coupling with the insulative mounting member and the second through-hole for coupling with the protection circuit board are formed in one of the metal plates for connection. Consequently, it is possible to easily mount the PTC element at a corresponding region of the battery pack. Also, at least one of the metal plates for connection achieves the electrical connection through a mechanical coupling structure not by welding or soldering. Consequently, it is possible to simplify the process of manufacturing the battery pack. Furthermore, it is possible to minimize the increase in size of the battery pack, thereby increasing the capacity of the battery pack as compared with other battery packs having the same standard.

Preferably, one end of the metal plate having the first through-hole and the second through-hole is bent upward such that the PTC element is easily coupled to the protection circuit board while being stably loaded on the insulative mounting member. Consequently, the upward bent end of the metal plate where the through-holes are formed is coupled to the insulative mounting member, and is then more stably and easily coupled to the protection circuit board located above the metal plate.

Meanwhile, the first through-hole may be formed in the plan shape of a slit, and the second through-hole may be formed in the plan shape of a star for reasons as previously described.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, exemplary embodiments of the present invention will be described in detail with reference to the accompanying drawings. It should be noted, however, that the scope of the present invention is not limited by the illustrated embodiments.

Figure 1:
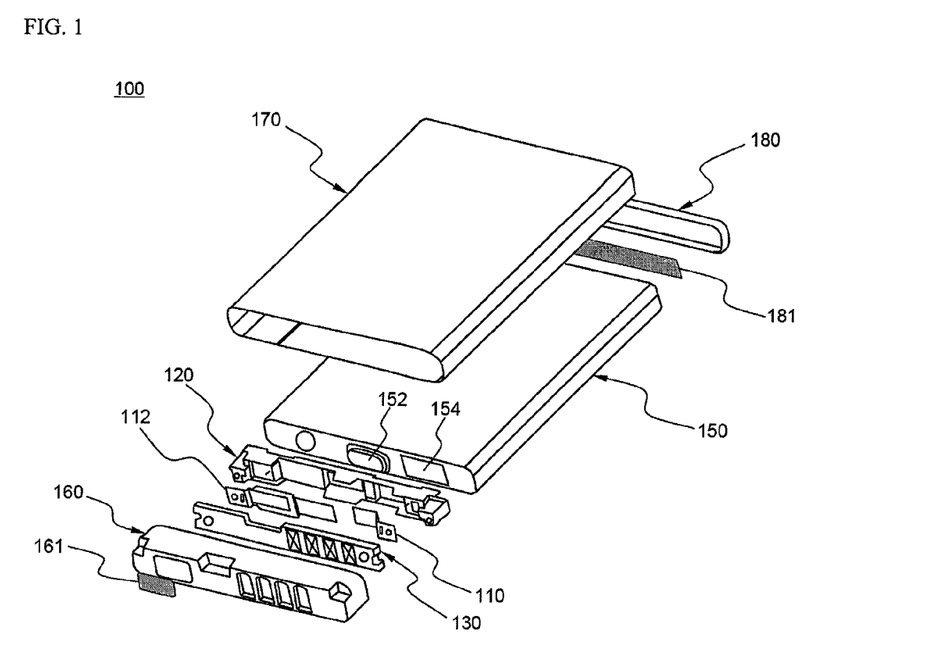
FIG. 1 is an exploded perspective view illustrating a secondary battery pack according to an exemplary embodiment of the present invention.

FIG. 1 is an exploded perspective view typically illustrating a secondary battery pack according to an exemplary embodiment of the present invention.

Referring to FIG. 1, the secondary battery pack 100 according to the present invention includes a battery cell 150, an insulative mounting member 120, a protection circuit board 130, a pair of connection members 110 and 112, a top cap 160, a bottom cap 180, and a sheathing film 170. The insulative mounting member 120, the connection members 110 and 112, the protection circuit board 130, and the top cap 160 are sequentially mounted on the top of the battery cell 150.

The insulative mounting member 120 is provided with openings 122 and 123 (See FIG. 2) through which electrode terminals 152 and 154 of the battery cell 150 are exposed outward. The insulative mounting member 120 is directly loaded on the top of the battery cell 150. The coupling of the insulative mounting member 120 to the top of the battery cell 150 may be achieved by an adhesive.

The insulative top cap 160 is coupled to the upper end of the battery cell 150 for covering the insulative mounting member 120 in a state in which the connection members 110 and 112 and the protection circuit board 130 are loaded on the insulative mounting member 120. The insulative top cap 160 extends downward by a predetermined length to cover the outside surface of the upper end of the battery cell 150. An after-sales service (A/S) label 161 is attached to one side of the top of the insulative top cap 160.

The bottom cap 180 is attached to the lower end of the battery cell 150 by an adhesive bottom cap tape 181. The outer circumference of the battery cell is covered by the insulative sheathing film 170.

Figure 2:
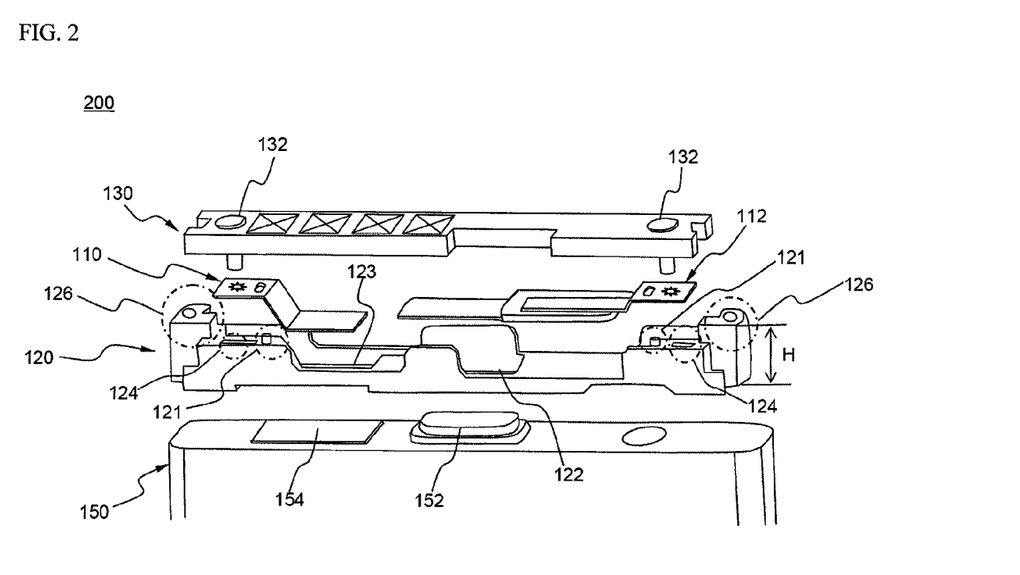
FIG. 2 is an enlarged partial development view typically illustrating the upper end of the secondary battery pack of FIG. 1.
Figure 3:
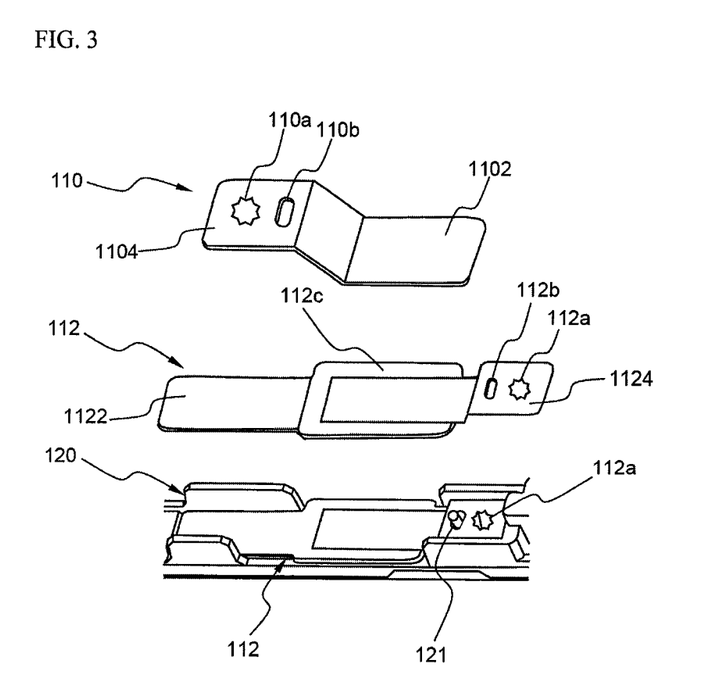
FIG. 3 is an enlarged view typically illustrating connection members at the upper end of the secondary battery pack of FIG. 1.

FIG. 2 is an enlarged partial development view typically illustrating the upper end of the secondary battery pack of FIG. 1, and FIG. 3 is an enlarged view typically illustrating connection members at the upper end of the secondary battery pack of FIG. 1.

Referring to these drawings, the insulative mounting member 120, the connection members 110 and 112, and the protection circuit board 130 are mounted on the upper end 200 of the secondary battery pack.

The insulative mounting member 120 has a size approximately equal to that of the top of the battery cell 150. The insulative mounting member 120 is provided at the middle part thereof with the first opening 122, through which the first electrode terminal 152 of the battery cell 150 is exposed outward, and the second opening 122, through which the second electrode terminal 152 of the battery cell 150 is exposed outward.

Opposite ends 126 of the insulative mounting member 120 protrude upward by a predetermined height H. The top of the insulative mounting member 120 is formed in a shape corresponding to the connection members 110 and 112 such that the connection members 110 and 112 are mounted on the top of the insulative mounting member 120 while being fixed in position. Also, the insulative mounting member 120 is provided at opposite sides thereof with protrusions 121, which are coupled into first through-holes 110b and 112b of the respective connection members 110 and 112, and coupling grooves 124, which communicate with second through-holes 110a and 112a of the respective connection members 110 and 112.

The connection members 110 and 112 are formed of a nickel plate. The connection members 110 and 112 include the first connection member 112, which is coupled to a positive temperature coefficient (PTC) element 112c, and the second connection member 110.

One end 1122 of the first connection member 112 is connected to the first electrode terminal 152 of the battery cell 150, and the other end 1124 of the first connection member 112 is connected to the protection circuit board 130. The first connection member 112 is coupled to the PTC element 112c. Consequently, when the internal temperature of the battery pack increases, it is possible for the first connection member 112 to interrupt electric current, thereby improving the safety of the battery pack.

One end 1102 of the second connection member 110 is connected to the second electrode terminal 154 of the battery cell 150, and the other end 1104 of the second connection member 110 is connected to the protection circuit board 130.

The ends 1124 and 1104 of the first connection member 112 and the second connection member 110, connected to the protection circuit board 130, are bent such that the ends 1124 and 1104 of the first connection member 112 and the second connection member 110 are higher than the ends 1122 and 1102 of the first connection member 112 and the second connection member 110, connected to the battery cell 150. Consequently, it is easy for the first connection member 112 and the second connection member 110 to be electrically connected to the protection circuit board 130 while the first connection member 112 and the second connection member 110 are stably loaded on the insulative mounting member 120.

Also, the first through-holes 110b and 112b of the respective connection members 110 and 112 are formed in the plan shape of a slit to provide tolerance during the assembling process. On the other hand, the second through-holes 110a and 112a of the respective connection members 110 and 112 are formed in the plan shape of a star to achieve high coupling and improved electrical connection between the connection members 110 and 112 and metal pins 132, as mechanical fastening members.

The protection circuit board 130 is mounted at the top of the insulative mounting member 120 on which the connection members 110 and 112 are loaded. The protection circuit board 130 is provided near opposite ends thereof with through-holes (not shown).

The metal pins 132 are inserted into the coupling grooves 124 of the insulative mounting member 120 through the through-holes of the protection circuit board 130, the second through-holes 110a and 112a of the connection members 110 and 112, thereby achieving the coupling of the protection circuit board 130 and the connection members 110 and 112 to the insulative mounting member 120. Although the connection members 110 and 112 come into contact with the protection circuit board 130 to achieve the electrical connection between the connection members 110 and 112 and the protection circuit board 130, the connection between the connection members 110 and 112 and the protection circuit board 130 is further stably achieved by the metal pins 132.

FIGS. 4 to 7 are partial perspective views illustrating a process of assembling the secondary battery pack of FIG. 1 step by step.

Figure 4:
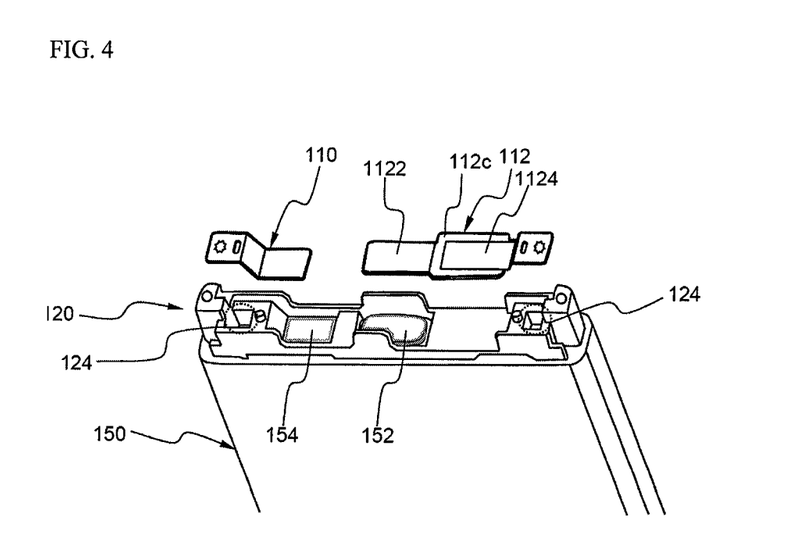
FIGS. 4 to 7 are partial perspective views illustrating a process of assembling the secondary battery pack of FIG. 1 step by step.
Figure 5:
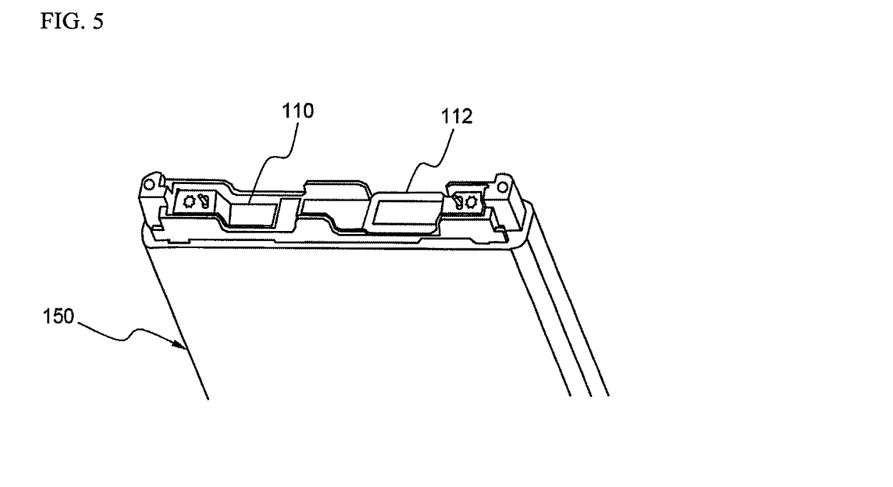

First, as shown in FIG. 4, the insulative mounting member 120 is attached to the top of the battery cell 150 by bonding. Subsequently, the first connection member 112, of which the bent nickel plate 1124 and the plate-shaped nickel plate 1122 are coupled to the top and bottom of the PTC element 112c, and the second connection member 110, of which the plate-shaped nickel plate is bent, are mounted to the insulative mounting member 120, as shown in FIG. 5. Subsequently, the ends of the first connection member 112 and the second connection member 110 are located at the first electrode terminal 152 (See FIG. 4) and the second electrode terminal 154 (See FIG. 4) of the battery cell 150, and then the coupling between the connection members and the corresponding electrode terminals of the battery cell is performed by welding.

Figure 6:
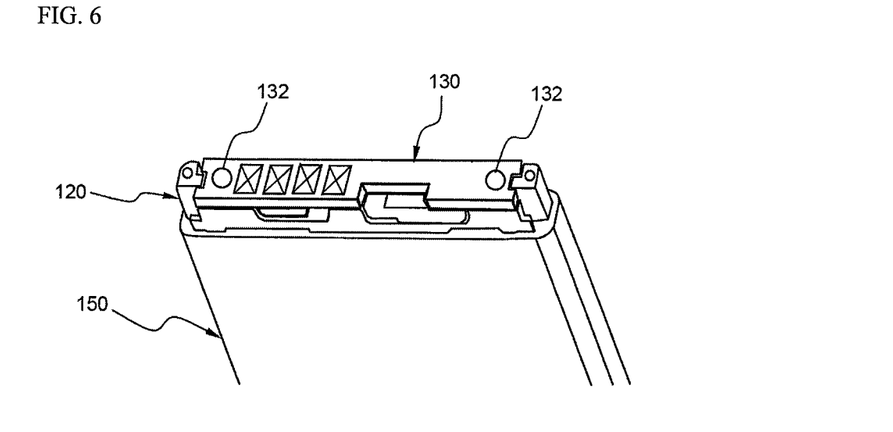

Subsequently, as shown in FIG. 6, the protection circuit board 130 is mounted on the insulative mounting member 120, on which the connection members 110 and 112 (See FIG. 5) are loaded, and then the metal pins 132 are inserted through the through-holes (not shown) of the protection circuit board 130 from above to couple the protection circuit board 130 to the insulative mounting member 120.

Figure 7:
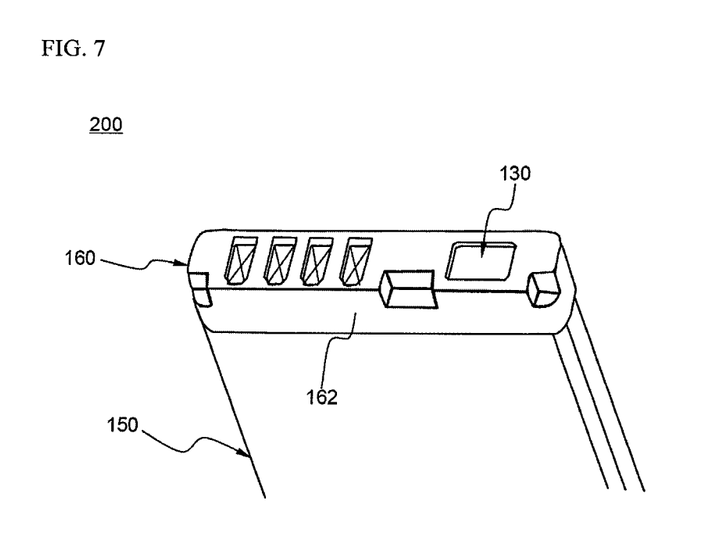

Finally, as shown in FIG. 7, the insulative top cap 160 is coupled to the upper end of the battery cell, such that the insulative top cap 160 covers the insulative mounting member 120, in a state in which the protection circuit board 130 and the connection members 110 and 112 (See FIG. 5) are loaded on the insulative mounting member 120 (See FIG. 6). A downward extension 162 of the insulative top cap 160 is joined to the outer surface of the upper end of the battery cell 150, such that the insulative top cap 160 covers the outer surface of the upper end of the battery cell 150, thereby completing the upper end 200 of the secondary battery pack.

INDUSTRIAL APPLICABILITY

As apparent from the above description, the secondary battery pack according to the present invention is constructed in a structure in which the insulative mounting member, the connection members, and the protection circuit board are coupled to the upper end of the battery pack by the mechanical fastening members. Consequently, the present invention has the effect of greatly simplifying the assembling process and achieving stable coupling between the components during the manufacturing process while improving the safety of the battery cell.

Also, the mechanical fastening members are not exposed outward from the battery. Consequently, the present invention has the effect of improving the reliability of a product in appearance and preventing the occurrence of a short circuit.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery pack comprising:
   a battery cell having an electrode assembly of a cathode/separator/anode structure mounted in a battery case together with an electrolyte in a sealed state;
   an insulative mounting member having openings through which electrode terminals of the battery cell are exposed outward, the insulative mounting member being constructed in a structure in which connection members and a protection circuit board are loaded on a top of the insulative mounting member, the insulative mounting member being mounted to a top of the battery cell; and
   an insulative cap coupled to an upper end of the battery cell for covering the insulative mounting member in a state in which the connection members and the protection circuit board are loaded on the insulative mounting member,
   wherein the insulative mounting member is provided at an upper part thereof with at least one coupling groove, the connection members and the protection circuit board are provided with through-holes communicating with the coupling groove, and a predetermined mechanical fastening member is inserted into the coupling groove through the through-holes, thereby achieving the coupling of the connection members and the protection circuit board to the insulative mounting member,
   wherein each of the connection members is provided at one end thereof with a first through-hole for coupling with the insulative mounting member,
   wherein the top of the insulative mounting member is formed in a shape corresponding to the connection members such that the connection members are mounted on the top of the insulative mounting member while being fixed in position,
   wherein the insulative mounting member is provided at opposite sides thereof with protrusions configured to be coupled into the first through-holes of the respective connection members,
   wherein the mechanical fastening member contributes to an electrical connection between connection members and the protection circuit board,
   wherein each of the connection members is provided at one end thereof a second through-hole which is one of the through-holes for coupling with the protection circuit board, and
   wherein the first through-hole is formed in the plan shape of a slit, and the second through-hole is formed in the plan shape of a star.

2. The secondary battery pack according to claim 1, wherein the battery case is a metal container.

3. The secondary battery pack according to claim 1, wherein one of the connection members is coupled to a positive temperature coefficient (PTC) element.

4. The secondary battery pack according to claim 3, wherein one end of the connection member ('first connection member') coupled to the PTC element is connected to the first electrode terminal of the battery cell while the other end of the first connection member is connected to the protection circuit board, and one end of the other connection member ('second connection member') is connected to the second electrode terminal of the battery cell while the other end of the second connection member is connected to the protection circuit board.

5. The secondary battery pack according to claim 4, wherein the one ends of the first connection member and the second connection member, connected to the protection circuit board, are bent such that the ends of the first connection member and the second connection member are higher than the other ends of the first connection member and the second connection member, connected to the battery cell, whereby the first connection member and the second connection member are connected to the protection circuit board while the first connection member and the second connection member are loaded on the insulative mounting member.

6. The secondary battery pack according to claim 4, wherein the connection members are formed of a nickel plate.

7. The secondary battery pack according to claim 1, wherein the insulative mounting member has a size approximately equal to that of the top of the battery cell, and the insulative mounting member is provided at a middle part thereof with a first opening, through which the first electrode terminal of the battery cell is exposed outward, and is provided at a position spaced a predetermined distance from the first opening with a second opening, through which a portion of a top of the battery case of the battery cell (the second electrode terminal) is exposed outward.

8. The secondary battery pack according to claim 1, wherein opposite ends of the insulative mounting member protrude upward by a predetermined height.

9. The secondary battery pack according to claim 1, wherein the mechanical fastening member is a conductive pin or rivet.

10. The secondary battery pack according to claim 1, wherein an adhesive is injected into the coupling groove and/or the through-holes before the coupling of the mechanical fastening member.

11. The secondary battery pack according to claim 1, wherein the insulative cap extends downward by a predetermined length such that at least a portion of the insulative cap covers the outside surface of the upper end of the battery cell in a state in which the insulative cap is coupled to the upper end of the battery cell.

12. The secondary battery pack according to claim 11, wherein the downward extension of the insulative cap is joined to the outer surface of the upper end of the battery cell by bonding or by mechanical coupling.

13. The secondary battery pack according to claim 1, further comprising another insulative cap (bottom cap) coupled to a lower end of the battery cell.

14. The secondary battery pack according to claim 1, further comprising a sheathing film attached to an outer surface of the battery case of the battery cell.

15. The secondary battery pack according to claim 14, wherein the sheathing film is attached to the outer surface of the battery case such that the sheathing film covers a lower extension of the insulative cap.

16. The secondary battery pack according to claim 1, wherein the battery cell is a prismatic lithium secondary battery cell.

17. A secondary battery pack, comprising:
  a battery cell having an electrode assembly of a cathode/separator/anode structure mounted in a battery case together with an electrolyte in a sealed state;
  an insulative mounting member, the insulative mounting member having openings through which electrode terminals of the battery cell are exposed outward, a pair of protrusions and a pair of coupling grooves, the insulative mounting member being mounted on top of the battery cell;
  a pair of connection members, each connection member having a first through hole and a second through hole;
  a protection circuit board on top of the insulative mounting member; and
  a fastener extending through the protection circuit board, through the first through hole on each of the connection members and engaging a side of each first through hole, and into the coupling grooves of the insulative mounting member, the fastener mechanically and electrically connecting the connection members and the protection circuit board,
  wherein the protrusions of the insulative mounting member extend through the second through hole on each of the connection members.

18. The secondary battery pack according to claim 17, wherein a width of the insulative mounting member is greater than a width of the protection circuit board,
  wherein opposite ends of the insulative mounting member have a raised section, and
  wherein a projection on a side of each of the raised sections engages a recess in an end of the protection circuit board.

* * * * *